(12) United States Patent
Kim et al.

(10) Patent No.: US 8,380,265 B2
(45) Date of Patent: Feb. 19, 2013

(54) MOBILE TERMINAL

(75) Inventors: Youngjoong Kim, Seoul (KR); Wonseok Joo, Seoul (KR); Seokhwan Oh, Incheon (KR); Janghyun Song, Seoul (KR); Minsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 202 days.

(21) Appl. No.: 12/862,836

(22) Filed: Aug. 25, 2010

(65) Prior Publication Data

US 2011/0058319 A1   Mar. 10, 2011

(30) Foreign Application Priority Data

Sep. 10, 2009  (KR) .................. 10-2009-0085592

(51) Int. Cl.
*H04M 1/00* (2006.01)
(52) U.S. Cl. .................. 455/575.8; 455/575.1
(58) Field of Classification Search ..... 455/575.1–575.8
See application file for complete search history.

(56) References Cited

U.S. PATENT DOCUMENTS

| 5,691,880 | A | * | 11/1997 | Seto et al. ............... 361/679.27 |
| 6,009,338 | A | * | 12/1999 | Iwata et al. ............... 455/575.4 |
| 7,885,058 | B2 | * | 2/2011 | Li et al. .................... 361/679.01 |
| 8,103,324 | B2 | * | 1/2012 | Yang et al. ................. 455/575.8 |
| 2005/0049016 | A1 | * | 3/2005 | Cho et al. .................. 455/575.8 |
| 2009/0111543 | A1 | * | 4/2009 | Tai et al. .................... 455/575.8 |

* cited by examiner

*Primary Examiner* — Lana N Le
(74) *Attorney, Agent, or Firm* — Birch, Stewart, Kolasch & Birch, LLP

(57) ABSTRACT

A mobile terminal includes: a terminal main body having a window formed on a front surface thereof; an interface disposed at the side of the main body and electrically connected with an external device; and a cap module configured to open and close the interface, wherein the cap module includes: a cover configured to cover the interface; and a movement mechanism configured to rotate the cover toward a front side or a rear side of the main body from the side of the main body and slidably moving a rotational center of the cover by interworking with a rotation of the cover.

18 Claims, 6 Drawing Sheets

MOBILE TERMINAL

CROSS REFERENCE TO RELATED APPLICATIONS

The present application claims priority to Korean Application No. 10-2009-0085592 filed in Korea on Sep. 10, 2009, the entire contents of which is hereby incorporated by reference in its entirety.

BACKGROUND OF THE INVENTION

1. Field of the Invention

The present invention relates to a mobile terminal having an interface electrically connected with an external device and a cap module covering the interface.

2. Description of the Related Art

Terminals may be divided into a mobile terminal (portable terminal) and a stationary terminal according to whether the terminal is portable or not. The mobile terminals may be divided into a handheld terminal that can be directly carried around and a vehicle mount terminal.

As functions are becoming diversified, terminals are implemented in the form of multimedia players having complex functions such as capturing images or video, reproducing music or video files, playing games, receiving broadcasts, etc. In order to support or increase the functions of the terminals, modifications of structural parts and/or software parts of the terminals may be taken into consideration.

One of the methods of improving a structural part of terminals, improvement of a cap module covering an interface may be taken into consideration.

SUMMARY OF THE INVENTION

Accordingly, one object of the present invention is to provide a mobile terminal having an interface which is conveniently opened and closed.

Another object of the present invention is to provide a mobile terminal having a cap module having good strength and rigidity.

To achieve these and other advantages and in accordance with the purpose of the present invention, as embodied and broadly described herein, the present invention provides in one aspect a mobile terminal including: a terminal main body; an interface disposed at the side of the main body and electrically connected with an external device; and a cap module configured to open and close the interface, wherein the cap module includes: a cover configured to cover the interface; and a movement mechanism configured to rotate the cover toward a front side or a rear side of the main body from the side of the main body and slidably moving a rotational center of the cover by interworking with a rotation of the cover.

The movement mechanism may include a support portion, a protrusion portion, and a rotational blade portion. The support portion may be formed to cover one surface of the case forming an external appearance. The protrusion portion may be protruded from at least one of both ends of the support portion. One end of the rotational blade portion may be connected with the cover, and the other end of the rotational blade portion may be rotatably connected with the protrusion portion. A support recess may be formed on one surface of the case such that it is parallel to the one surface, and the support portion may include an insertion protrusion protruded from one corner connecting the both ends of the support portion and inserted into the support recess.

The protrusion portion may include a guide slot formed to extend to the support portion in a sloping direction, and the other end of the rotational blade portion may be slidably and rotatably connected with the guide slot. The protrusion portion may include a projection protruded from one end of the protrusion portion, and a step portion may be formed at the main body to allow the projection to be caught with respect to a rotational direction of the cover.

A plurality of rotational blade portions may be provided to be connected with the both ends of the cover. The movement mechanism may include the blade support portion. The blade support portion may connect the plurality of rotational blade portions and may be mounted on a surface covering the interface of the cover. The rotational blade portion may be formed to be protruded to be perpendicular to the surface covering the interface of the cover.

The movement mechanism may include a rotation hampering portion. The rotation hampering portion may be formed to be elastically deformed according to a rotation of the rotation blade portion to hamper a rotation of the rotation blade portion. One end of the rotation hampering portion may extend from the protrusion portion, the other end of the rotation hampering portion may be a free end. The rotation hampering portion may be formed such that at least a portion thereof is protruded to the rotation blade portion between both ends thereof.

The movement mechanism may include a rotation mechanism and a sliding mechanism. The rotation mechanism may rotate the cover to open and close the interface, and the sliding mechanism may make the cover slide in one direction cooperatively according to a rotation of the cover. The rotation mechanism may include a rotation blade portion extending from a rotational center of the cover and connected with the cover so as to rotate the cover, and the sliding mechanism may be formed to shift the rotational center to be away from the interface or close to the interface.

The side surface of the main body may be formed as a curved face, and the rotational center may slide in a sloping direction with a front side of the main body so that the cover can move along the curved face when it is rotated. The cover may be formed as a curved face to correspond to the side surface of the main body, and a portion adjacent to one corner of the cover may be formed to have a thickness gradually reduced in the rotation direction.

When the cover is rotated in a direction of opening the interface, the movement mechanism may move the cover from a position on the same plane as the side surface of the main body to the side surface of the main body.

An accommodation chamber may be formed on a rear surface of the main body in order to accommodate a battery therein. A battery cover may be mounted on the main body to cover the accommodation chamber. The cover may be formed such that, when the cover moves in the direction of opening the interface, it covers the battery cover.

To achieve these and other advantages and in accordance with the purpose of the present invention, as embodied and broadly described herein, the present invention provides in another aspect a mobile terminal including: a terminal case including a through hole formed on one surface and a cover for covering the through hole; an interface disposed at the through hole and electrically connected with an external device; a rotation mechanism configured to rotate the cover to open and close the interface; and a sliding mechanism configured to make the cover slide in one direction cooperatively according to a rotation of the cover. The rotation mechanism may include a rotation blade portion extending from a rotational center of the cover and connected with the cover so as to rotate the cover, and the sliding mechanism may be formed to shift the rotational center to be away from the interface or close to the interface.

To achieve these and other advantages and in accordance with the purpose of the present invention, as embodied and broadly described herein, the present invention provides in still another aspect a mobile terminal including: a terminal main body; an interface disposed at the side of the main body and electrically connected with an external device; and a cap module configured to open and close the interface, wherein the cap module includes: a cover extending along the side surface of the main body and covering the interface; and a movement mechanism configured to rotate the cover toward a front side or a rear side of the main body from the side of the main body and moving the cover in a direction in which the cover becomes away from the interface according to the rotation.

When the cover is rotated in the direction of opening the interface, the movement mechanism may move the cover from a position on the same plane as the side surface of the main body to a position covering at least one of the side surface, a front surface and a rear surface of the main body.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
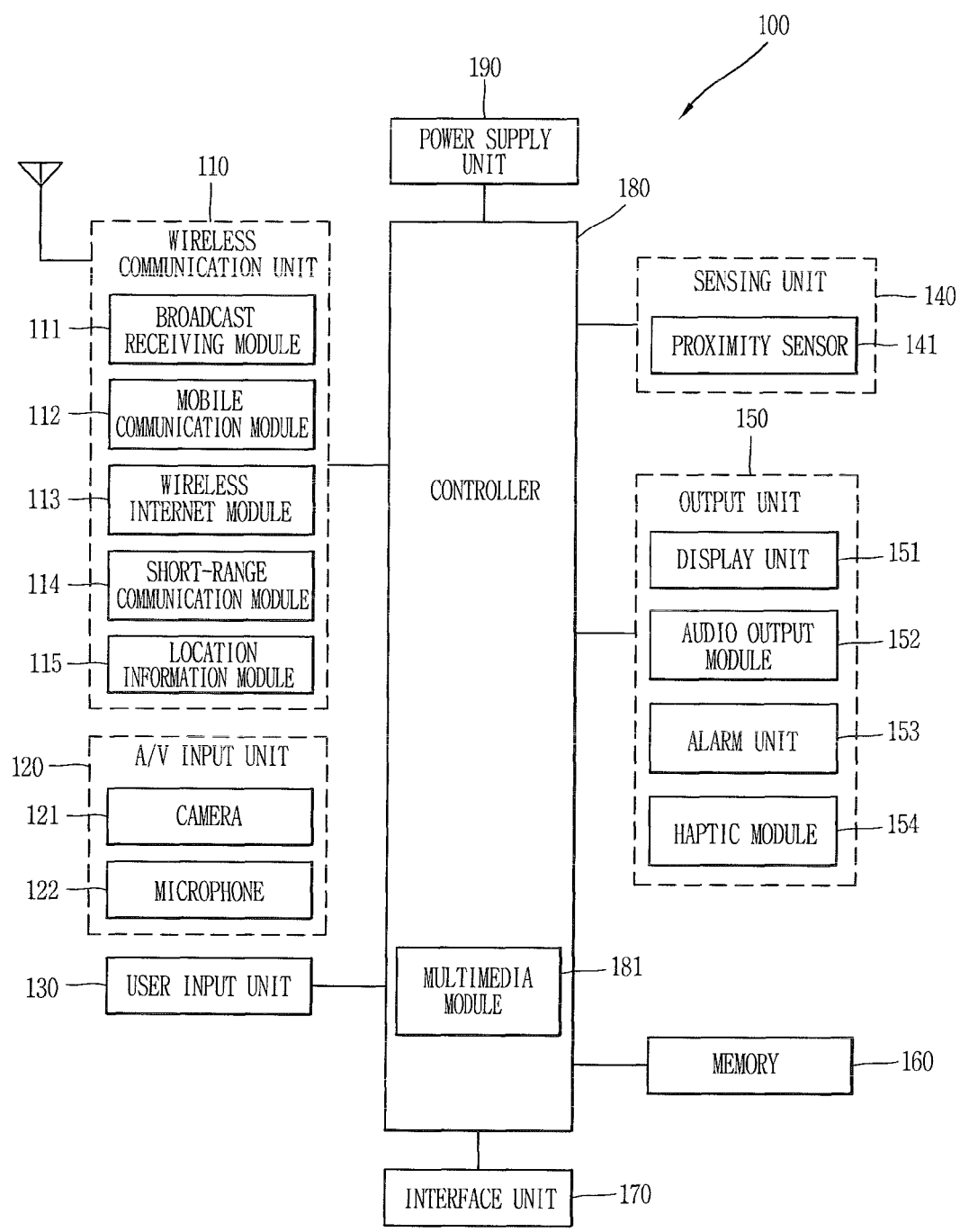
FIG. 1 is a schematic block diagram of a mobile terminal according to an exemplary embodiment of the present invention.

A mobile terminal and an inputting method of a mobile terminal according to exemplary embodiments of the present invention will now be described with reference to the accompanying drawings. For the same elements and equivalents to those shown in the figures and in the description, the same or like reference numerals are used and a corresponding detailed explanation is omitted merely for the sake of convenience. As used herein, the singular forms are intended to include the plural forms as well, unless the context clearly indicates otherwise.

In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, except for any elements especially configured for a mobile purpose.

FIG. 1 is a block diagram of a mobile terminal according to an exemplary embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. Outputs informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
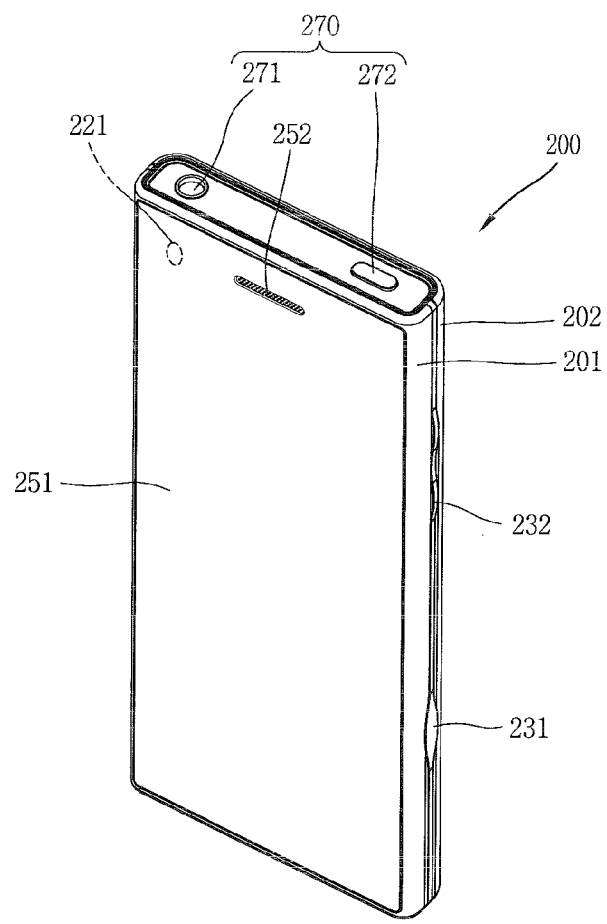
FIG. 2A is a front perspective view of a mobile terminal implementing an embodiment of the present invention.

FIG. 2*a* is a front perspective view of a mobile terminal according to an exemplary embodiment of the present invention.

The mobile terminal 200 includes a bar type terminal body. Without being limited thereto, the present invention can be also applicable to a slide type mobile terminal, a folder type mobile terminal, a swing type mobile terminal, a swivel type mobile terminal and the like, including two or more bodies.

The terminal body includes a case (or casing, housing, cover, etc.) constituting the external appearance of the terminal body. In the present exemplary embodiment, the case may be divided into a front case 201 and a rear case 202. Various electronic components are installed in the space between the front case 201 and the rear case 202. One or more intermediate cases may be additionally disposed between the front case 201 and the rear case 202.

The cases may be formed by injection-molding a synthetic resin or may be made of a metallic material such as stainless steel (STS) or titanium (Ti), etc.

A display unit 251, an audio output module 252, a camera 221, and user input units 231 and 232, and the like, may be located on the terminal body, namely, mainly, on the front case 201.

Various types of visual information may be displayed on the display unit 251. The information may be displayed in the form of character, number, symbol, graphic, icon, etc. In order to input the information, at least one of the character, number, symbol, graphic and icon is displayed in a certain arrangement so as to be implemented in the form of a keypad. Such keypad may be so-called 'soft key'.

The display unit 251 may be operated as a whole region or may be divided into a plurality of regions and accordingly operated. In the latter case, the plurality of regions may be operation in association with each other.

The user input unit 230 is manipulated to receive commands for controlling the operation of the mobile terminal 100, and may include a plurality of manipulation units 231 and 232.

The manipulation units 231 and 232 may be generally called a manipulating portion, and they can employ any method so long as they can be manipulated in a tactile manner by the user.

Content inputted by the first and second manipulation units 231 and 232 may be variably set. For example, the first manipulation unit 231 receives commands such as start, end, scroll, or the like, and the second manipulation unit 232 may receive commands such as adjustment of size of a sound outputted from the audio output unit 252 or conversion to a touch recognition mode of the display unit 251.

A wired/wireless headset port 271 and a wired/wireless data port 272 may be disposed at one side of the mobile terminal. The ports 271 and 272 may be configured as an example of the interface 270.

Figure 2B:
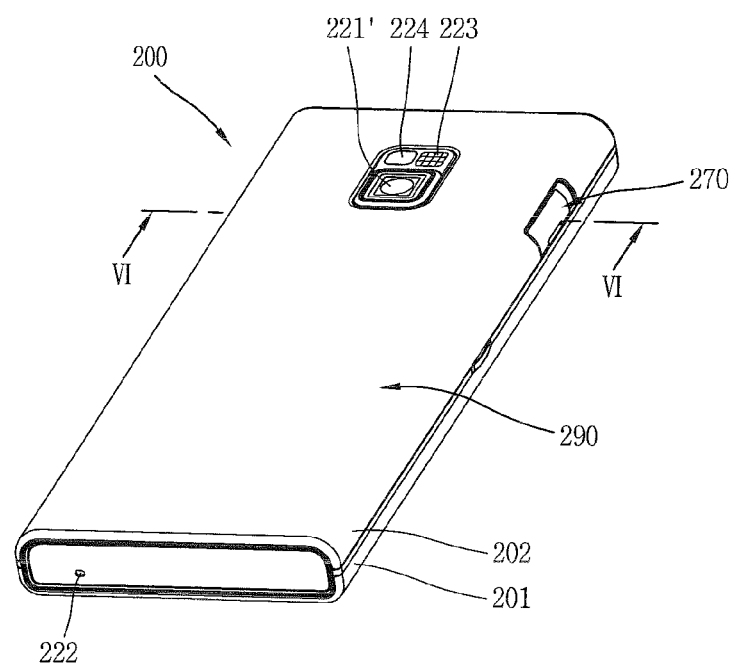
FIG. 2B is a rear perspective view of a mobile terminal implementing an embodiment of the present invention.

FIG. 2*b* is a rear perspective view of the mobile terminal illustrated in FIG. 2*a* according to an exemplary embodiment of the present invention.

With reference to FIG. 2*b*, a camera 221' may additionally be disposed on a rear surface of the terminal body, namely, on the rear case 202. The camera 221' may have an image capture direction which is substantially opposite to that of the camera 121 (See FIG. 2*a*), and may support a different number of pixels (i.e., have a different resolution) than the camera 221.

For example, camera 221 may operate with a relatively lower resolution to capture an image(s) of the user's face and immediately transmit such image(s) to another party in real-time during video call communication or the like. Meanwhile the camera 221' may operate with a relatively higher resolution to capture images of general objects with high picture quality, which may not require immediately transmission in real time. The cameras 221 and 221' may be installed on the terminal such that they are rotated or popped up.

A flash 223 and a mirror 224, may be additionally disposed adjacent to the camera 221'. When an image of the subject is captured with the camera 221', the flash 123 illuminates the subject. The mirror 224 allows the user to see himself when he wants to capture his own image (i.e., self-image capturing) by using the camera 221'.

An audio output unit may be additionally disposed on the rear surface of the terminal body. The audio output unit may implement a stereoscopic function along with the audio output unit 252 (See FIG. 2*a*), and may be used for implementing a speaker phone mode during call communication.

A broadcast signal receiving antenna may be disposed at the side of the terminal body in addition to an antenna that supports mobile communications. The antenna 116 forming a portion of the broadcast reception module 111 (in FIG. 1) may be installed to be protracted.

A microphone 222, an interface 270, and the like, may be provided on the terminal body. The microphone 22 may be disposed on a region adjacent to another end portion with one end portion where the audio output module 252 is disposed on the display unit.

A user input unit 232, an interface 270, and the like, may be disposed on the sides of the front case 201 and the rear case 202. The interface 270 may be formed to be electrically connected with an external device.

A power supply unit 290 for supplying power to the mobile terminal 200 may be mounted on the terminal body. The power supply unit 290 may be installed in the terminal body or may be directly detached from the outside of the terminal body.

Figure 3:
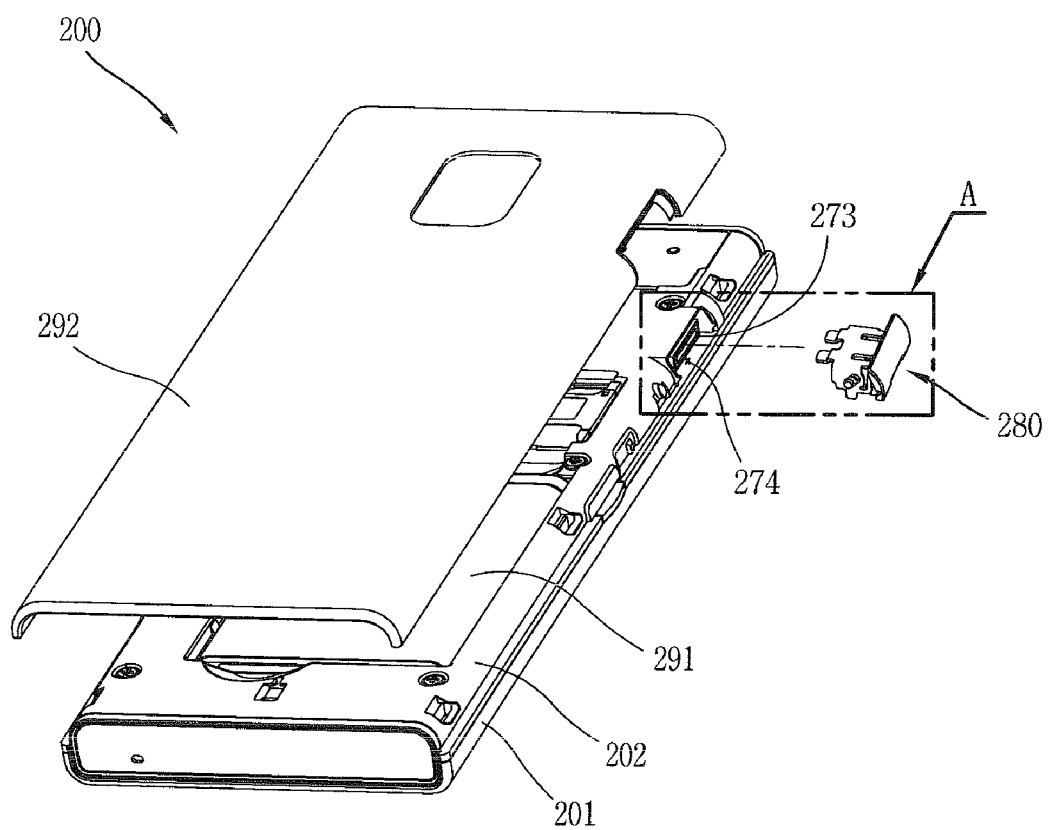
FIG. 3 is an exploded perspective view showing a portion of the mobile terminal of FIG. 2B.
Figure 4:
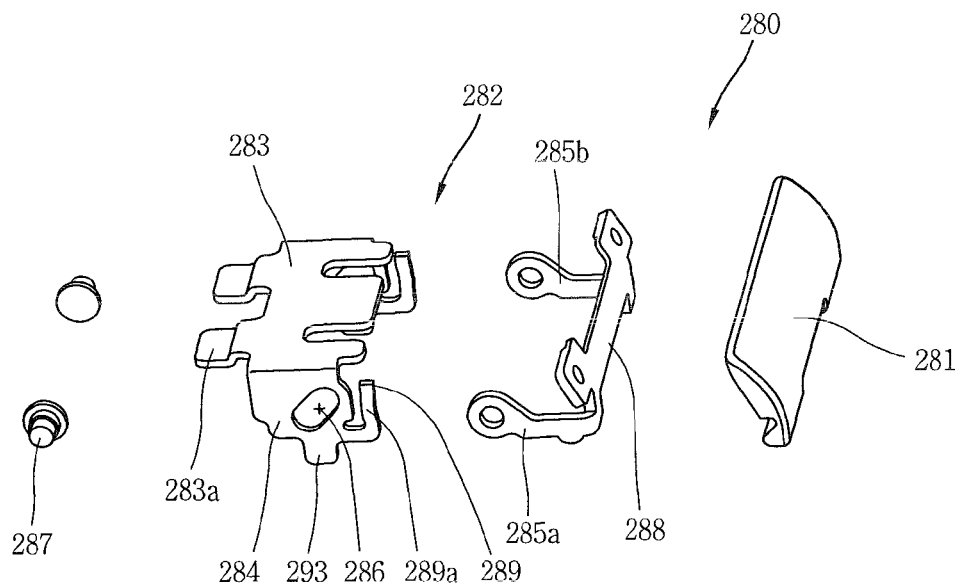
FIG. 4 is an enlarged exploded perspective view showing a cap module of FIG. 3.
Figure 5:
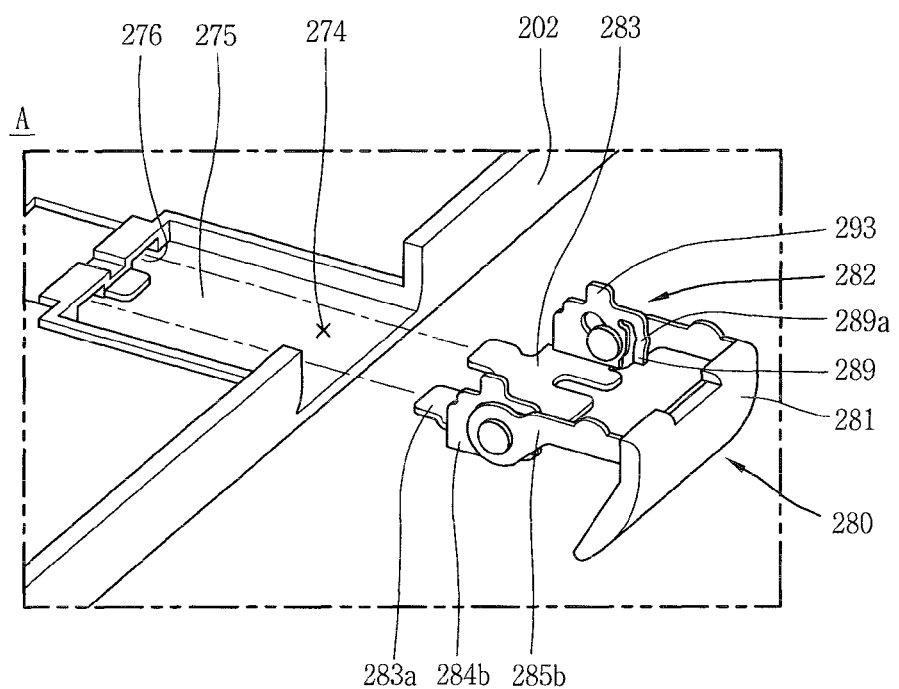
FIG. 5 is an enlarged coupled perspective view of a portion 'A' in FIG. 3.

FIG. 3 is an exploded perspective view showing a portion of the mobile terminal of FIG. 2B. FIG. 4 is an enlarged exploded perspective view showing a cap module of FIG. 3. FIG. 5 is an enlarged coupled perspective view of a portion 'A' in FIG. 3.

With reference to FIGS. 3, 4, and 5, a circuit board (not shown) is mounted in an internal space formed by the front case 201 and the rear case 202 constituting an external appearance of the terminal body, and a connection port 273 which can be electrically connected with an external device is mounted on the circuit board. An interface 270 (See FIG. 2B) is configured as an example of the interface 270 (See FIG. 2B). In the following description, the connection port 273 of the interface 270 according to an exemplary embodiment of the present invention will be described but the present invention is not limited thereto. The interface 270 may be, for example, wired or wireless headset ports, external power supply (or battery charger) ports, wired or wireless data ports, memory card ports, ports for connecting a device having an identification module, audio input/output (I/O) ports, video I/O ports, earphone ports, or the like.

The connection port 273 may receive data from an external device or power and transfer the received inputs to one or more elements within the mobile terminal 200 or may be used to transfer data between the mobile terminal and an external device.

A through hole 274 is formed on the rear case 202 such that the connection port 273 is exposed. In the following description, the connection port 273 and components related to the connection port 273 are disposed on the rear case 202, but the present invention is not limited thereto. For example, the connection port 273 may be disposed on the front case 201.

With reference to these drawings, the connection port 273 and the through hole 274 are disposed on the side of the rear case 202, respectively, and a window 251a (See FIG. 6A) may be mounted on the front surface of the front case 201.

An accommodation chamber is formed on the rear surface of the rear case 202 to accommodate a battery 291, and a battery cover 292 may be mounted on the rear case 202 in order to cover the accommodation chamber.

A cap module 280 is mounted on the terminal body in order to open and close the connection port 273.

With reference to FIGS. 3 and 4, the cap module 280 extends along the side of the terminal body, and includes a cover 281 to cover the connection port 273.

The cover 281 may form a lengthwise direction, for example, along the side of the rear case 202, and the lengthwise direction of the cover 281 is longer than a widthwise direction of the cover 281. The cover 281 has a bar-like shape forming both ends with respect to the lengthwise direction. The cover 281 may be made of, for example, a metal material, by which the cover 281 may be a different texture from a cover made of a different type of material. Also, the 281 may be implemented to have better strength and rigidity than that of the related art cover. However, the present invention is not limited thereto and the cover 281 may be made of a synthetic material or the like.

The configuration in which the cover 281 is disposed to close the connection port 273 will now be described with reference to FIG. 2B. In the close configuration, the side (namely, the face crossing the face covering the connection port) of the cover 281 faces the face confining the through hole 274, and a front surface (namely, the opposite side of the face covering the connection port 273) of the cover 281 is formed to be coplanar with the side of the rear case 122.

With reference to FIGS. 3 and 4, the cap module 280 includes a movement mechanism 282.

The movement mechanism 282 is configured to move both ends of the cover 281 toward a circumferential surface (namely, the rear surface of the body) of the rear case 202 from the side of the rear case 202 in order to open the connection port 273. However, the present invention is not limited thereto, and the movement mechanism 282 may be configured to move the both ends of the cover 281 toward the circumferential surface (namely, the front surface of the body) of the front case 201 from the side of the rear case 202 in order to open the connection port 273.

The movement mechanism 282 includes a rotational mechanism and a sliding mechanism. The rotation mechanism is configured to rotate the cover 281 to open and close the connection port 273, and the sliding mechanism is configured to slide the cover 281 in one direction cooperatively according to a rotation of the cover 281.

In this manner, unlike the related art, because the cover 281 is formed to slide and be rotated, the opening and closing structure in which the both ends of the cover 28 are moved can be implemented.

The configuration of the movement mechanism 282 having the rotation mechanism and the sliding mechanism will now be described in detail with reference to FIGS. 4 and 5.

The movement mechanism 282 includes at least one of a support portion 283, a protrusion portion 284, and a rotation blade portion 285.

The support portion 283 is formed to cover one surface of the rear case 202. In detail, the support portion 283 is made of a metal material such as stainless steel.

With reference to FIG. 5, a mounting portion 275 being in surface-contact with the support portion 283 is formed on the rear case 202. The mounting portion 275 is formed to be recessed in an inner surface of the rear case, in which the support portion 283 is mounted. The mounting portion 275 may have an opening formed at one side thereof, and is connected with the through hole 274 of the rear case 202.

An insertion protrusion 283a may be protruded from one corner of the support portion 283. A plurality of insertion protrusions 283a may be provided. The insertion protrusions 283a may be bent from one corner of the support portion 283 so that the face of the support portion 283 covering the rear case 202 and the circumferential surface of the insertion protrusion 283a may have a step.

A support recess 276 is formed on one surface of the rear case 202 such that it is parallel to one surface of the rear case 202. The support recess 276 may be formed at the opposite side of the opening of the mounting portion 275. The support recess 276 is formed to be perpendicular to the direction in which the mounting portion 275 is recessed.

The support recess 276 is formed to be insert-fit with the insertion protrusion 283a of the support portion 283. As the insertion protrusion 283a is insert-fit in the support recess 276, the movement mechanism 282 is fixed.

The support portion 283 may form both ends connected by the corner from which the insertion protrusion 283a is protruded. At least one of the both ends of the support portion 283 includes a protrusion portion 284. With reference to FIGS. 4 and 5, a plurality of protrusion portions 284 are provided. The plurality of protrusions 284 extend to be bent from both ends of the support portion 283.

The protrusion portion 284 includes a guide slot 286 extending in a direction sloping toward the support portion 283. The guide slot 286 is formed as a long hole in one direction, and a lengthwise direction of the guide slot 286 is formed in a direction sloping toward the circumferential surface of the rear case 202.

The guide slot 286 is connected with the rotational blade portions 285a and 285b.

One end of each of the rotation blade portions 285a and 285b is connected with the cover 281 and formed to be protruded to be perpendicular to the face covering the connection port 273 (See FIG. 3).

The other end of each of the rotation blade portions is rotatably connected with the protrusion portion 284. In detail, the other end of each of the rotation blade portions 285a and 285b is slidably and rotatably connected with the guide slot 286. As the rotation blade portions 285a and 285b are connected with the cover 281, the both ends of the cover 281 are rotatably and slidably moved together.

For example, a through hole is formed at the other end of each of the rotation blade portions 285a and 285b, and a hinge shaft 287 is inserted into the guide slot 286 through the through holes of the rotation blade portions 285a and 285b. Accordingly, the rotation blade portions 285a and 285b are rotated by using the hinge shaft 287 as a rotational center, and as the hinge shaft 287 slides along the guide slot 286, the rotation blade portions 285a and 285b are linearly moved.

The rotation mechanism is implemented such that the rotation blade portions 285a and 285b extend from a rotational center so as to be connected with the cover 281 in order to rotate the cover 281. The sliding mechanism is formed such that the rotational center becomes away from the connection port 273 or close to the connection port 273.

With reference to these drawings, a plurality of rotation blade portions 285a and 285b are provided to be connected with the both ends of the cover 281. The plurality of rotational blade portions 285a and 285b are connected with the plurality of guide slots 286, and accordingly, the both ends of the cover 281 make a movement dependent on the rotation blade portions 285a and 285b.

The plurality of rotation blade portions 285a and 285b are connected by a blade support portion 288. For example, the blade support portion 288 is mounted on a the face of the cover 281 covering the connection port 273, and the plurality of rotation blade portions 285a and 285b are bent from the both ends of the blade support portion 288. The blade support portion 288 and the cover 281 are made of a metal material so as to be coupled through welding.

The movement mechanism 282 may include a rotation hampering portion 289 formed to be elastically deformed according to a rotation of the rotation blade portions 285a and 285b to hamper a rotation of the rotation blade portions 285a and 285b.

One end of the rotation hampering portion 289 extends from the protrusion portion 284, and the other end of the rotation hampering portion 289 is formed as a free end. In detail, the rotation hampering portion 289 is formed as a cantilever and is configured to be deformed to be bent. The rotation hampering portion 289 may be deformed to be perpendicular to a rotational plane of the rotation blade portions 285a and 285b and/or restored.

At least a portion of the rotation hampering portion 289 is protruded toward the rotation blade portions 285a and 285b. The protruded portion 289a of the rotation hampering portion 289 may be formed to press the rotation blade portions 285a and 285b in a state that the cover 281 is closed to hamper a rotation of the rotation blade portions 285a and 285b. Also, the protruded portion 289a of the rotation hampering portion 289 may be formed to overlap with the rotation blade portions 285a and 285b with respect to a rotational direction of the rotation blade portions 285a and 285b in a state that the cover 281 is closed, whereby when the rotation blade portions 285a and 285b are rotated, the rotation hampering portion 289 is deformed to be bent.

Figure 6A:
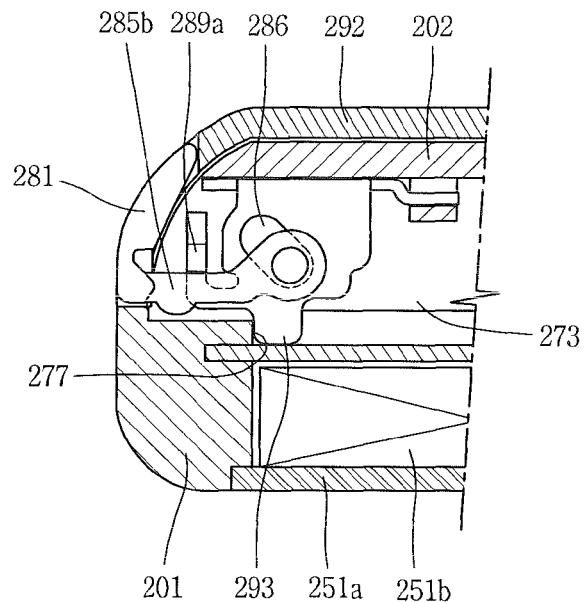
FIGS. 6A and 6B are partial sectional views taking along line VI-VI of FIG. 2B and showing the operation of opening and closing the cap module.
Figure 6B:
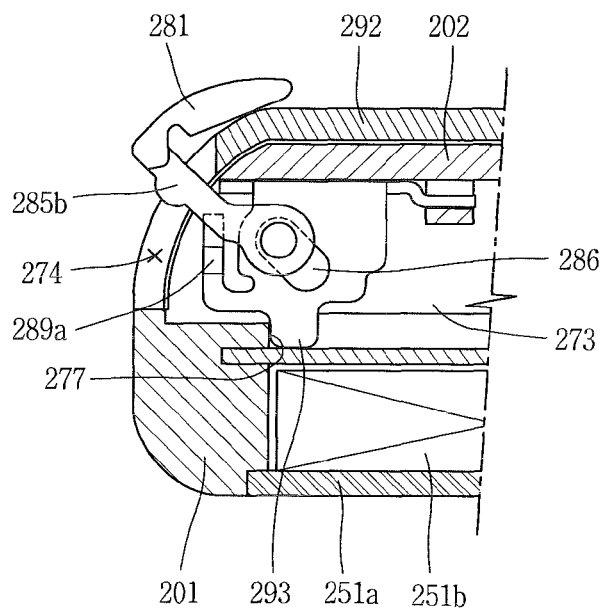

The cap module 280 will now be described in more detail with reference to FIGS. 6A and 6B. FIGS. 6A and 6B are partial sectional views taking along line VI-VI of FIG. 2B and showing the operation of opening and closing the cap module.

With reference to these drawings, the window 251a is mounted on the front surface of the terminal, namely, on one surface of the front case 201. The window 251a may be made of a material allowing for a light transmission, for example, a light transmissive synthetic resin, tempered glass, and the like. The window 251a may include a portion not allowing for a light transmission.

A display module 251b may be mounted on a rear surface of the window 251a. The portion of the window 251a allowing for a light transmission may have an area corresponding to the display module 251b. Accordingly, the user can recognize visual information outputted from the display module 251b.

A touch sensor may be mounted on the window 251a. The touch sensor is formed to sense a touch input and formed to be light-transmissive (or transparent). The touch sensor is mounted on the rear surface of the window 251a, and may be configured to convert a change in electric capacity or the like generated from a particular portion of the window 251a into an electrical input signal.

With reference to these drawings, when the cover 281 is rotated in a direction in which the connection port 273 is open, the movement mechanism 281 moves the cover 281 to a position at which the cover 281 covers the side of the terminal body from a position at which the cover 281 is coplanar with the side of the terminal body. For example, the cover 281 is formed to cover at least a portion of the battery cover 292 when the connection port 273 is moved in a direction in which it is open.

The rotation mechanism rotates the cover 281 to open and close the connection port 273, and the sliding mechanism makes the cover 281 slid in one direction cooperatively according to a rotation of the cover 281.

The side of the terminal body, specifically, the side of the rear case 202, makes a curved surface, and the rotational center of the rotation blade portion 285b slides in a direction sloped to the front surface of the terminal body so that the cover 281 can be moved along the curved surface while being rotated.

The cover 281 has a curved surface to correspond to the side of the rear case 202, and a portion adjacent to one corner of the cover 281 is formed such that its thickness is gradually reduced in the rotation direction of the cover 281. A corner of the cover 281 connects the both ends of the cover that move together, and may be a corner where it meets the battery cover 292 first with respect to the rotation direction. The battery cover 292 is also formed as a curved surface to correspond to the side of the rear case 202.

When the user applies force to the cover 281 in a direction in which the connection port 273 is open, one end of the cover 281 slides along the curved surface of the battery cover 292, opening the connection port 273, to move to the position at which it covers at least a portion of the battery cover 292. In detail, in order to make the cover 281 slide along the curved surface of the battery cover 292, the cover 281 is rotated based on the hinge shaft 287 and the hinge shaft 287 slides along the guide slot 286.

With reference to these drawings, a projection 293 is formed to be protruded from one end of the protrusion portion 284, and a step portion 277 is formed by which the projection 283 is caught in rotational direction of the cover 281. The step portion 277 is formed to face the projection 292 with respect to the rotational direction on the front case 201 in order to prevent the projection 293 from being rotated together with the cover 281.

Figure 7:
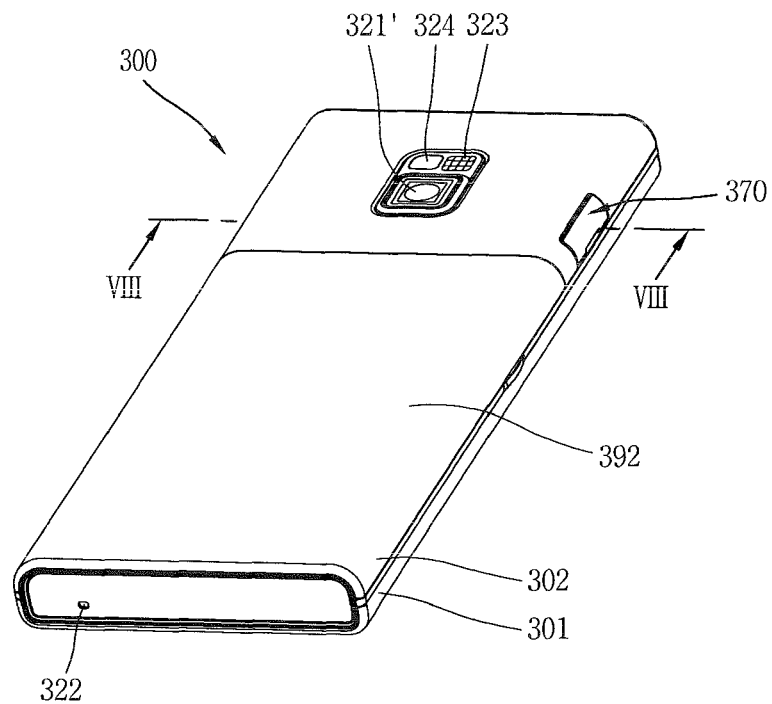
FIG. 7 is an exploded view of a mobile terminal according to an exemplary embodiment of the present invention.
Figure 8:
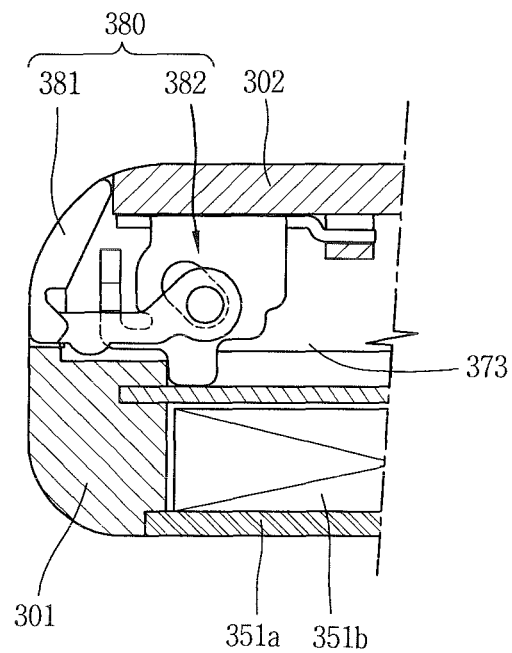
FIG. 8 is a sectional view taken along line VIII-VIII in FIG. 7.

FIG. 7 is an exploded view of a mobile terminal according to an exemplary embodiment of the present invention, and FIG. 8 is a sectional view taken along line VIII-VIII in FIG. 7.

With reference to FIGS. 7 and 8, a window 251a is mounted on the front surface of the terminal body, and an interface 370 is disposed on the side of the terminal body such that the interface 370 can be electrically connected with an external device. A connection port 373 is provided as an example of the interface 370, and the cap module 280 is mounted on the side of the terminal body in order to open and close the connection port 373.

The cap module 280 includes a cover 301 and a movement mechanism 382.

The cover 301 extends along the side of the terminal body and covers the connection port 373. The movement mechanism 282 rotates the cover 301 from the side of the terminal body toward a front or rear side of the terminal body to open the connection port 373, and moves the cover 301 such that it becomes away from the connection port 373 according to the rotation.

When the cover 301 is rotated in the direction of opening the connection port 373, the movement mechanism 382 moves the cover 301 to a position at which the cover 301 covers at least one of the side surface, the front surface, and the rear surface of the terminal body from a position at which the cover 301 is coplanar with the side of the terminal body.

With reference to these drawings, for example, the cap module 380 is formed to move the cover 301 to a position at which the cover 301 covers the rear surface of the terminal body. The battery cover 393 is formed to cover only a portion of the circumferential surface of the rear case 302, and the cover 301 is disposed between the front case 301 and the rear case 302 at a position separated from the battery cover 393.

When the user rotates the cover 301, one end of the cover 301, sliding along the front case 301, opens the connection port 373. Accordingly, although the cap module 380 is configured such that the sliding distance based on rotation is short, the both ends of the cover 301 can be rotated and slide to open and close the connection port 373.

As so far described, the mobile terminal according to an exemplary embodiment of the present invention has the following advantages. That is, the movement mechanism of moving both ends of the cover facilitates the user's opening and closing operation. Also, a novel form of interface opening and closing structure, different from the related art, can be implemented through the cover formed to slide and rotate.

In addition, because the cover is moved as a whole to the position at which it cover one surface of the main body, the cover can be made of a metal material. Accordingly, the cover has a material sense different from that of the related art and has superior strength and rigidity.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a terminal main body having a window formed on a front surface thereof;
   an interface disposed at the side of the main body and electrically connected with an external device; and
   a cap module configured to open and close the interface,
   wherein the cap module comprises:
   a cover configured to cover the interface; and
   a movement mechanism configured to rotate the cover toward a front side or a rear side of the main body from the side of the main body and slidably moving a rotational center of the cover by interworking with a rotation of the cover,
   wherein the movement mechanism comprises:
   a support portion formed to cover one surface of a case forming an external appearance of the main body;
   a protrusion portion protruded from at least one of both ends of the support portion; and
   a rotational blade portion having one end connected with the cover and the other end rotatably connected with the protrusion portion.

2. The mobile terminal of claim 1, wherein a support recess is formed on one surface of the case such that it is parallel to the one surface, and the support portion comprises an insertion protrusion protruded from one corner connecting the both ends of the support portion and inserted into the support recess.

3. The mobile terminal of claim 1, wherein the protrusion portion comprises a guide slot formed to extend in a sloping direction with respect to the support portion, and the other end of the rotational blade portion may be slidably and rotatably connected with the guide slot.

4. The mobile terminal of claim 3, wherein the protrusion portion comprises a projection protruded from one end of the protrusion portion, and a step portion is formed at the main body to allow the projection to be caught with respect to a rotational direction of the cover.

5. The mobile terminal of claim 1, wherein a plurality of rotational blade portions are formed to be connected with both ends of the cover.

6. The mobile terminal of claim 5, wherein the movement mechanism further comprises a blade support portion connecting the plurality of rotational blade portions mounted on a surface covering the interface of the cover.

7. The mobile terminal of claim 5, wherein the rotational blade portions are formed to be protruded to be perpendicular to the surface covering the interface of the cover.

8. The mobile terminal of claim 1, wherein the movement mechanism comprises a rotation hampering portion formed to be elastically deformed according to a rotation of the rotational blade portion to hamper a rotation of the rotation blade portion.

9. The mobile terminal of claim 8, wherein one end of the rotation hampering portion extends from the protrusion portion, the other end of the rotation hampering portion is a free end, and the rotation hampering portion is formed such that at least a portion thereof is protruded to the rotational blade portion between both ends thereof.

10. The mobile terminal of claim 1, wherein the movement mechanism comprises:
    a rotation mechanism rotating the cover to open and close the interface; and
    a sliding mechanism making the cover slide in one direction cooperatively according to a rotation of the cover.

11. The mobile terminal of claim 10, wherein the rotation mechanism comprises the rotational blade portion extending from a rotational center of the cover and connected with the cover so as to rotate the cover, and the sliding mechanism is formed to shift the rotational center to be away from the interface or close to the interface.

12. The mobile terminal of claim 11, wherein the side surface of the main body is formed as a curved face, and the rotational center slides in a sloping direction with a front side of the main body so that the cover can move along the curved face when it is rotated.

13. The mobile terminal of claim 12, wherein the cover is formed as a curved face to correspond to the side surface of the main body, and a portion adjacent to one corner of the cover is formed to have a thickness gradually reduced in the rotation direction.

14. The mobile terminal of claim 1, wherein, when the cover is rotated in a direction of opening the interface, the movement mechanism moves the cover from a position on the same plane as the side surface of the main body to the side surface of the main body.

15. The mobile terminal of claim 1, wherein an accommodation chamber is formed on a rear surface of the main body in order to accommodate a battery therein, a battery cover is mounted on the main body to cover the accommodation chamber, and the cover is formed such that, when the cover moves in the direction of opening the interface, it covers the battery cover.

16. A mobile terminal comprising:
   a terminal case including a through hole formed on one surface and a cover for covering the through hole;
   an interface disposed at the through hole and electrically connected with an external device;
   a rotation mechanism configured to rotate the cover to open and close the interface; and
   a sliding mechanism configured to make the cover slide in one direction cooperatively according to a rotation of the cover,
   wherein the rotation mechanism comprises a rotation blade portion extending from a rotational center of the cover and connected with the cover so as to rotate the cover, and the sliding mechanism is formed to shift the rotational center to be away from the interface or close to the interface,
   wherein the side surface of the main body is formed as a curved face, and the rotational center slides in a sloping direction with a front side of the main body so that the cover can move along the curved face when it is rotated, and
   wherein the cover is formed as a curved face to correspond to the side surface of the main body, and a portion adjacent to one corner of the cover is formed to have a thickness gradually reduced in the rotation direction.

17. A mobile terminal comprising:
   a terminal main body having a window formed on a front surface thereof;
   an interface disposed at the side of the main body and electrically connected with an external device; and
   a cap module configured to open and close the interface,
   wherein the cap module comprises:
   a cover extending along the side surface of the main body and covering the interface; and
   a movement mechanism configured to rotate the cover toward a front side or a rear side of the main body from the side of the main body and moving the cover in a direction in which the cover becomes away from the interface according to the rotation,
   wherein the movement mechanism comprises:
   a support portion formed to cover one surface of a case forming an external appearance of the main body;
   a protrusion portion protruded from at least one of both ends of the support portion; and
   a rotational blade portion having one end connected with the cover and the other end rotatably connected with the protrusion portion.

18. The mobile terminal of claim 17, wherein when the cover is rotated in the direction of opening the interface, the movement mechanism moves the cover from a position on the same plane as the side surface of the main body to a position covering at least one of the side surface, a front surface and a rear surface of the main body.

* * * * *